United States Patent [19]
Kouoheris et al.

[11] Patent Number: 5,758,085
[45] Date of Patent: May 26, 1998

[54] SEMICONDUCTOR MEMORY BASED SERVER FOR PROVIDING MULTIMEDIA INFORMATION ON DEMAND OVER WIDE AREA NETWORKS

[75] Inventors: Jack Lawrence Kouoheris, Mohegan Lake; Manoj Kumar, Yorktown Heights, both of N.Y.

[73] Assignee: International Business Machines Corporation, Armonk, N.Y.

[21] Appl. No.: 778,230

[22] Filed: Jan. 8, 1997

Related U.S. Application Data

[63] Continuation of Ser. No. 294,673, Aug. 23, 1994, abandoned.

[51] Int. Cl.[6] .................................................. G06F 13/00
[52] U.S. Cl. .......................... 395/200.61; 395/200.64
[58] Field of Search .................... 395/200.01, 200.61, 395/200.64; 370/255; 348/7

[56] References Cited

U.S. PATENT DOCUMENTS

| | | | |
|---|---|---|---|
| 4,236,250 | 11/1980 | Huffman | 455/49 |
| 5,115,426 | 5/1992 | Spanke | 370/60 |
| 5,150,463 | 9/1992 | Ward et al. | 395/200.03 |
| 5,440,334 | 8/1995 | Walters et al. | 348/6 |
| 5,442,390 | 8/1995 | Hooper et al. | 348/7 |
| 5,461,611 | 10/1995 | Drake, Jr. et al. | 370/54 |
| 5,467,345 | 11/1995 | Cutler, Jr. et al. | 370/60 |
| 5,477,541 | 12/1995 | White et al. | 370/94.1 |
| 5,477,542 | 12/1995 | Takahara et al. | 370/94.1 |
| 5,485,455 | 1/1996 | Dobbins et al. | 370/60 |
| 5,488,411 | 1/1996 | Lewis | 348/8 |
| 5,490,252 | 2/1996 | Macera et al. | 395/200.01 |
| 5,491,800 | 2/1996 | Goldsmith et al. | 395/200.12 |
| 5,508,940 | 4/1996 | Rossmere | 364/514 A |
| 5,521,923 | 5/1996 | Willmann et al. | 370/94.1 |
| 5,539,449 | 7/1996 | Blahut et al. | 348/7 |
| 5,583,561 | 12/1996 | Baker | 348/7 |

*Primary Examiner*—Eric Coleman

[57] ABSTRACT

A method and apparatus for delivering multimedia video data from a server (host processor) to a plurality of clients connected to a communications network. More specifically, with this invention, preprocessed video and multimedia data packets are stored in switches of the network. When a client desires to receive the video and multimedia data, sends a request to the host processor which in turn sends a control message to the switches storing the requested data. These switches in turn send the requested data to the requesting client. If the data is not stored in the switches, the data must then be forwarded directly from the server to the requesting client.

8 Claims, 14 Drawing Sheets

FIG. 13A
I  B  B  B  P  B  B  B  P  B  B  B  I
FIG. 13B
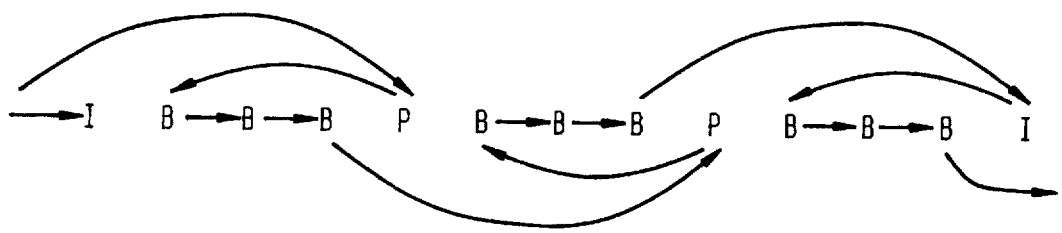
FIG. 13C
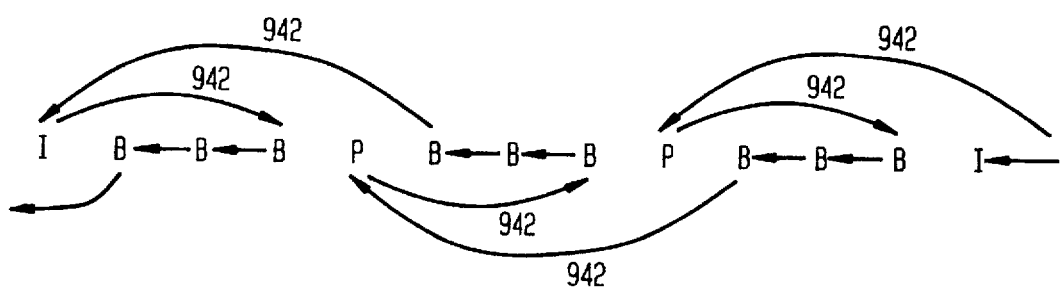
FIG. 13D
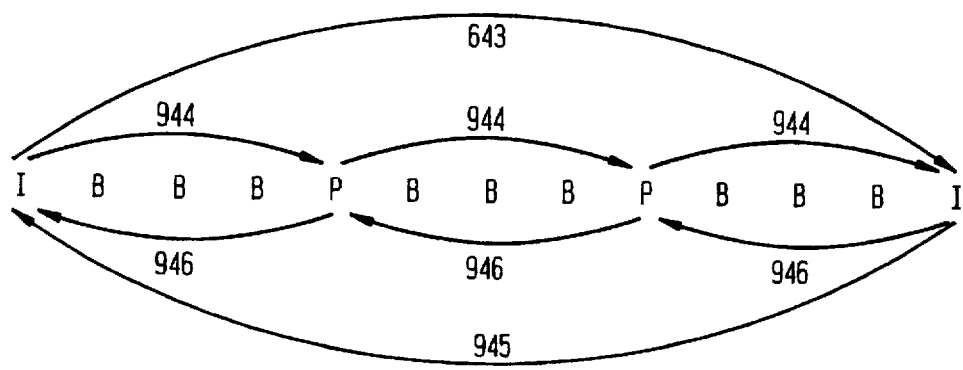

SEMICONDUCTOR MEMORY BASED SERVER FOR PROVIDING MULTIMEDIA INFORMATION ON DEMAND OVER WIDE AREA NETWORKS

This is a continuation of application Ser. No. 08/294,673, filed Aug. 23, 1994, now abandoned.

DESCRIPTION

1. Technical Field

This invention relates to a method and apparatus for delivering multimedia and video data from a server over a communications network to requesting clients.

2. Description of the Prior Art

The systems for delivering information and entertainment services to an end user's home have three distinct components: the server system, the end user system, and the network for simultaneously connecting a large number of end users (clients) to the server. The two most widely used systems for delivering information to the home are the public telephone network and the broadcast/cable television system. The telephone network today provides access to electronically stored textual information such as bank account balances, as well as audio segments such as instructions for various office procedures.

It is widely believed that the advances in technology will enable interactive multimedia services. The services contemplated are video on demand for movies, news, sports, TV programs etc., home shopping, interactive games, surrogate travel, and a wide variety of educational and information services. However, all three components of the traditional information/entertainment delivery systems, the servers, the network, and the end user terminal (PC or set-top-box) need improvement to deliver the interactive multimedia services. The PCs and set top boxes need the capability to receive and decompress full motion video and accompanying audio. The network must have sufficient bandwidth to allow each user to have his own dedicated video channel to the server, and for most services, the server must be capable of delivering a large number of video streams concurrently at low cost.

The key handicap of todays telephone network is the limited bandwidth available to each end user, which is sufficient for just one audio channel. This precludes the transfer of motion video information, and is also slow for high resolution images. Television, both cable and broadcast, offer much higher bandwidth to each user, but due to limited total bandwidth of the network (bandwidth of the cable or spectral bandwidth allocated on the airwaves) the user can not interactively select the information he is interested in. Instead his choice is limited to one of the about 50 programs being broadcast at any given time. Thus, current telephone and television networks, both broadcast and cable, are unsuitable for delivering interactive multimedia services such as video on demand and interactive games.

But the providers of the telephone and cable television services are capitalizing on the advances in technology to remove the above mentioned limitations. The increasing level of integration in VLSI technology has helped in bringing down the cost of motion video compression/ decompression hardware and enabled technologies like ADSL (Asymmetric Digital Subscriber Loop). These two make it practical to transmit and receive motion video from a users home, and switch it in the local telephone office, thus providing each user his dedicated video channel. Similarly the advances in fiber optic transmission technology and its declining cost have enabled upgrades in cable TV network's trunk and feeder systems which increase the bandwidth of the network sufficiently to provide each active subscriber his dedicated channel to the head-end for receiving compressed digital video. Direct broadcast satellites and other emerging wireless communication technologies also provide dedicated video channels between a large number of end users and a server. Personal computers and set top boxes are also emerging which enable networked multimedia applications, taking advantage of the low cost video compression/ decompression hardware and new powerful, but inexpensive microprocessors.

While the end user (client) systems and the network infrastructure is evolving rapidly to meet the requirements of interactive multimedia services, the currently used servers continue to be expensive and impractical for delivering these services because of the limited number of streams that can be supported by each server. The current choice of servers for interactive multimedia services has been off-the-shelf mainframes or work-station technology based parallel computing systems. The hardware and software in both cases is optimized for computation intensive applications and for supporting multiple concurrent users (time sharing), with very limited emphasis on moving data to and from the network interfaces and the I/O devices. For example, the bandwidth from the memory to cache in an RS/6000 is 400 MBytes/sec. while that from the I/O or network devices to the system is only 80 MBytes/sec. The floating point support adds to the cost of the system without providing any benefit to the delivery of video/multimedia data. The network protocols are optimized for reliable delivery of data over unreliable low speed network links, network infrastructure and application environment of the early seventies, as opposed to less stringent reliability requirements of video over more robust modern networks, thus introducing unnecessary CPU overheads.

The above factors force the price/performance of general purpose computing system based video/multimedia servers to be much higher than that of a system optimized for delivery of video. The publicly acknowledged activity in addressing the above mentioned limitations has been so far minimal and restricted to optimizing the placement of data on an array of disks to maximize the disk throughput in video server applications [3, 4], in optimizing the policy for buffering data retrieved from the disks to maximize its reuse in the video server environment [5, 6], or in optimizing the file system for video data [7]. Such improvements can improve the price performance of current video server systems by a factor of two or four, but improvements in the range of 100 to 1000 are needed to make the interactive multimedia services economically feasible.

The two patents by Hoarty et. al. (U.S. Pat. Nos. 5,093, 718 and 5,220,420) propose the use of multiple servers each serving a small neighborhood, and the full multimedia program is off-loaded to these servers. In contrast, we use large servers which off-load only the video content delivery part of the multimedia application to switches or routers in a network. Application control, i.e., determining which video sequence to play and when to play it, remains in the central servers Support functions like billing also remain in the central server.

U.S. Pat. No. 5,287,507 to Hamilton and Nelson addresses the problem which arises when a client wishing to send the reference to some information to another client, passes a pointer to a copy of that information stored in its local cache rather than the pointer to the copy stored in the server, which allows the receiving clients to reconstruct the pointer to the information stored in the server. Our delivery scheme does not assume the presence of local caches, so this patent has no relevance to our invention.

U.S. Pat. No. 5,005,122 to Griffen et al proposes the use of server computers, in a network containing a large number of client computers, to provide services such as back up, software distribution etc. It does not address the design of servers for delivery of continuous media information.

U.S. Pat. No. 5,218,697 to Chung proposes a method of providing a central file server in a network of heterogeneous file servers running different operating systems, different file servers, and different file systems. Chung teaches that local file servers can directly access the file system of the central file server by sending file system commands to it, rather than follow the traditional method of sending a file server request to the central server which must then translate it to appropriate file system command.

U.S. Pat. No. 5,287,461 to Moore concerns remotely located servers. The method proposed is to multiplex the console lines of multiple servers and used a modem to transmit the multiplexed information to the desired location.

U.S. Pat. No. 4,897,781 to Chang et al teach a network file system where clients have a local cache for opened files. The patent teaches a method for making use of the already cached information from some file, for another access to the same file made with a different open command.

SUMMARY OF THE INVENTION

It is an object of this invention to provide interactive multimedia services over a communications network at reduced cost.

It is a more specific object of this invention to reduce overhead associated with the delivery of video content from a server to a requesting client by off-loading video content to switches of the network which can more efficiently deliver the video content to the requesting clients.

This invention describes a method for reducing the cost of delivering video streams by a factor of hundred to a thousand in comparison to traditional approaches by making enhancements to the network. The proposed enhancement allows video/multimedia content to be stored in the switches or routers of a network in the format of network packets. The multimedia application server transmits a control message to the switch or router storing the network packets for the requested video or multimedia information to send one or more of these packets to a specified client. The switch or router receiving such instruction retrieves the requested packets, modifies the header and possibly the trailer information of the packets, particularly the routing information which allows the network to move these packets through a sequence of routers and switches to the specified client, and places these packets on the network. To support a large number of streams, in the order of several ten thousands of streams, semiconductor storage is used to store the prepacketized video, and special purpose hardware is used to retrieve the packets and modify the header information. See video dispatcher in FIG. 4 below and description of stream control and output adapter below. Semiconductor storage can be augmented with disk storage to store video contents of low popularity. To support fewer streams, of several hundred to few thousand streams, only disks may be used, and a microcontroller/microprocessor can be used instead of the special purpose hardware to retrieve the packets and modify the header information.

BRIEF DESCRIPTION OF THE DRAWINGS

FIG. 13A illustrates a sequence of frames in a video stream in presentation order.

FIGS 13B, 13C, and 13D illustrate decode orders of the frame sequence of FIG. 13A for left-to-right, backward (right-to-left), and fast forward/rewind respectively.

DESCRIPTION OF THE PREFERRED EMBODIMENT

In the following embodiment we will describe the use of switches to off-load the video/multimedia or continuous media content, but the following discussion can easily be adapted to the use of routers/bridges etc. in place of switches. Furthermore, while we describe the use of a packet-switched network which transports only fixed size cells, the following embodiment can easily be adapted for use in networks which transport variable size packets or in circuit switched networks. In this embodiment we use an ATM (Asynchronous Transfer Mode) broadband network, and use the AAL5 (ATM Adaptation Layer) adaptation layer [1]. Finally, though in this embodiment we describe the delivery of only video information which is stored in compressed form, it will be obvious to those skilled in the art that one could also handle uncompressed video information and other continuous media information like audio, animation etc., without any changes in the embodiment. Different audio or video information could be compressed at different rates. For example, music may be compressed at a higher bit rate (lower compression ration) than voice conversation. A continuous media stream could also consist of several streams of different media types multiplexed together as in MPEG-II (Motion Picture Expert Group) transport stream.

In our embodiment we will use MPEG-II transport stream carrying one video and one audio channel as a video content. We will assume that each second of this video is compressed into 4 Megabits of digital data.

Figure 1:
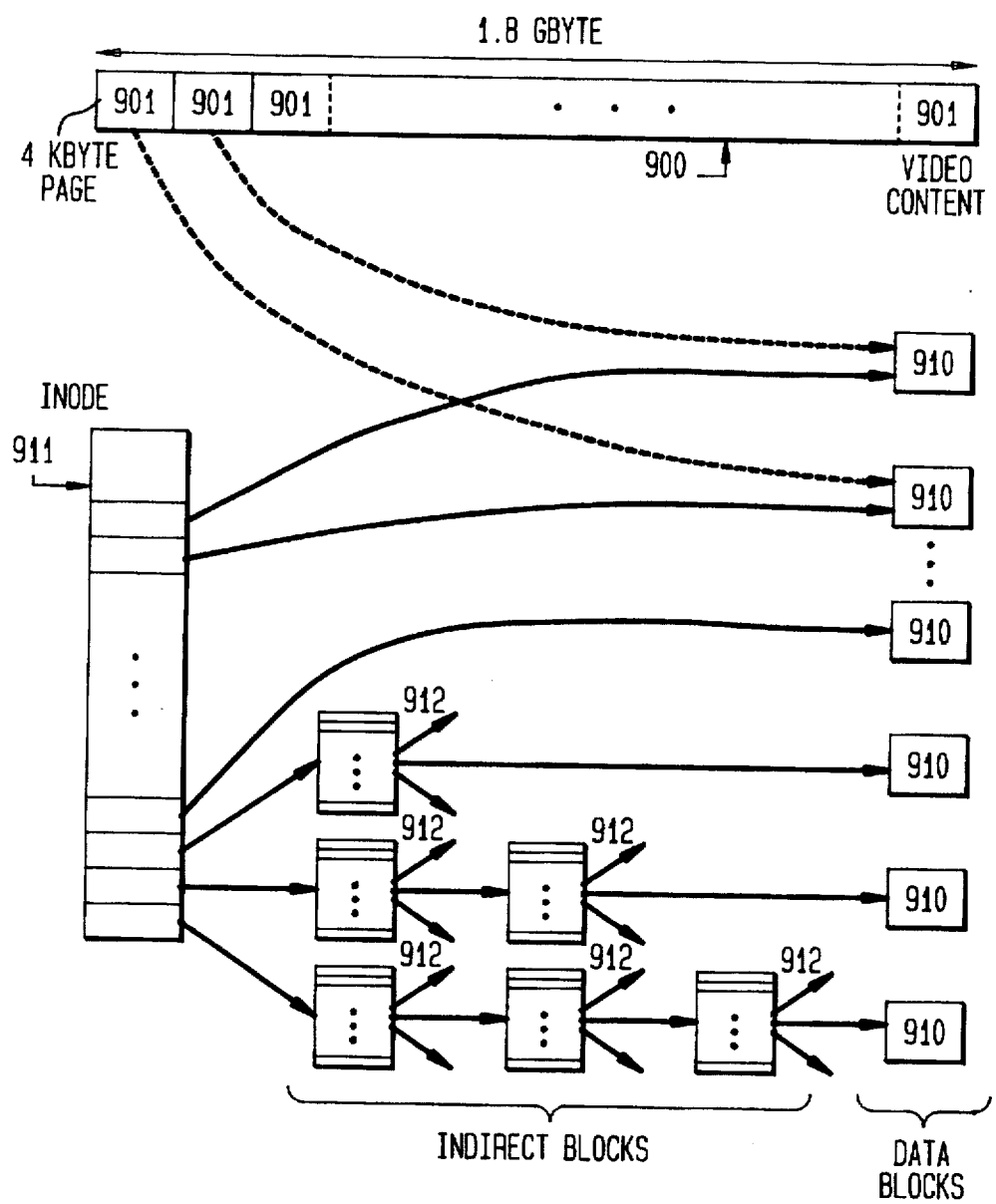
FIG. 1 schematically illustrates the organization of data in a file of a UNIX [1] operating system.

The embodiment of our invention has two distinct components, the first is the off-loading of the video content from the host or application server to the switches in the network, and the second is the switching hardware capable of storing video content and dispatching it when instructed by the host to the specified clients. Below, there is a description of the format in which video content is stored in the network, and of the additional data that is stored with the video content to minimize the hardware required in the switches to retrieve and dispatch it to clients. Also, below, there is a description of the hardware modifications/ additions needed in a shared buffer switch to store video in semiconductor storage, to implement the operations for allocating and reclaiming this storage, and to support the retrieval and dispatch of video content when requested by the host. In the last section we briefly present some alternate embodiments for the same inventions where network switches other than shared buffer switches are employed, and disk storage is used in place of semiconductor storage.
Off-Loading Video Content from Host to Switches in the Network Referring to FIGS. 1 and 2, the first step of our invention comprises of offloading video content 900 (FIG. 2B) into the switches 60 (FIG. 2A) of an ATM Broadband network 50. The MPEG-II transport stream for a one hour program will be roughly 1.8 Gigabytes of digital data, 900. When stored in a general purpose computer running a Unix like operating system, this data 900 will be partitioned into 4 Kbyte pages 901 (FIG. 1), and stored perhaps on a magnetic disk, as roughly 450 thousand data blocks 910, with each data block having 4 Kbytes. In addition to these data blocks representing the video content, there would be other information stored on the disk such as the Inodes 911 and indirect blocks 912, collectively known as metadata. See [2]. This metadata, also shown in FIG. 1, is stored separately from the video content, i.e., in disk blocks different than those storing the video content. This metadata is used by the operating system to locate the pages belonging to a particular video file, and to further locate pages storing a specified region of data of the video content file.

Figure 6:
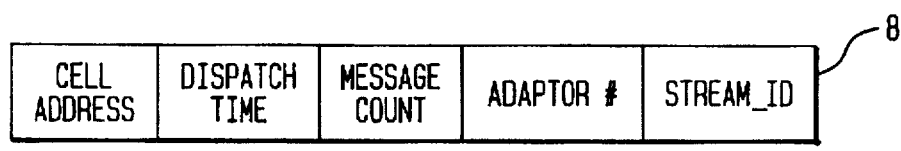
FIG. 6 schematically illustrates the format of the control message sent from the host processor to the switch. [1] UNIX is a registered trademark licensed to X/OPEN Company, Ltd.
Figure 7:
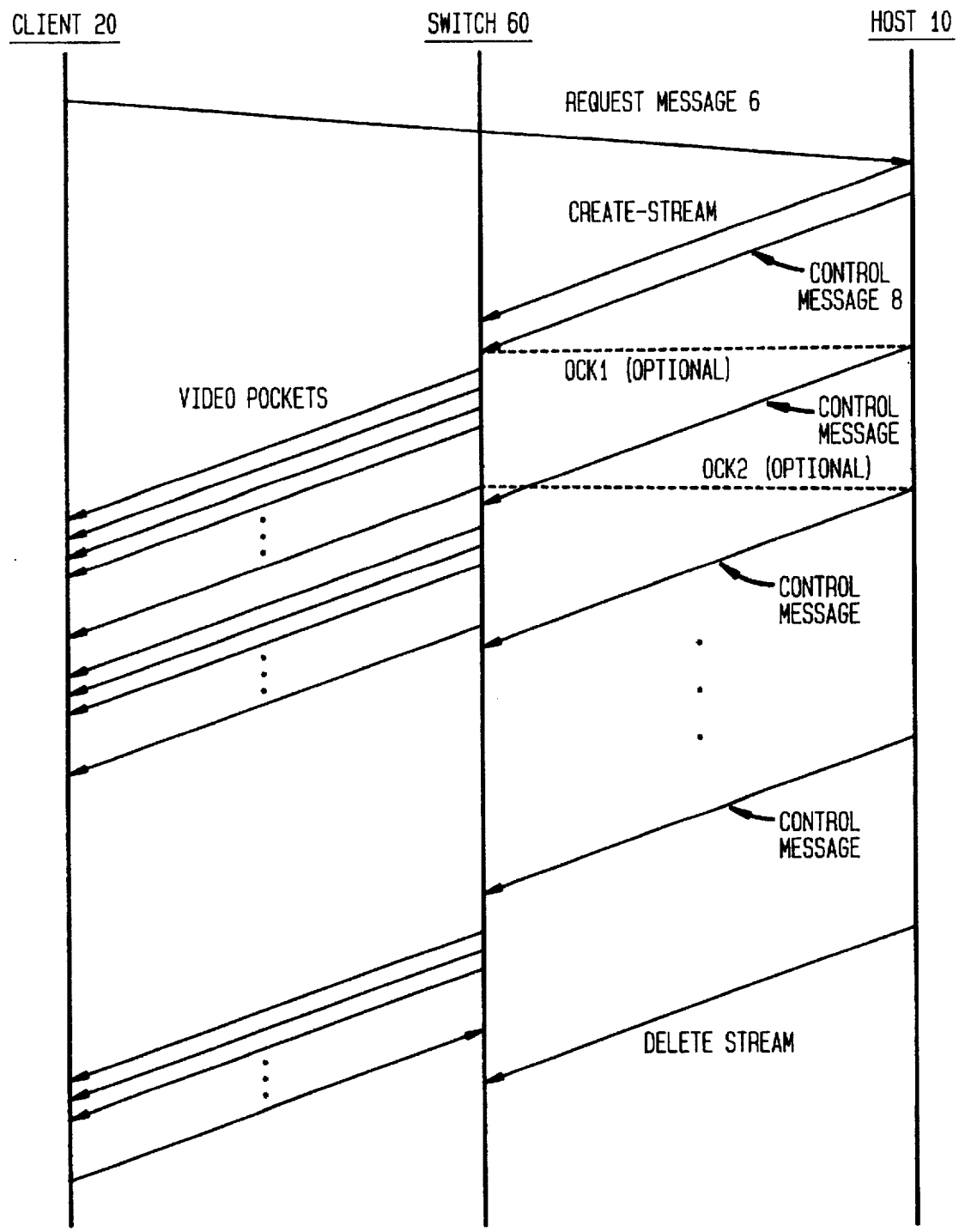
FIG. 7 illustrates the flow of messages between the client, switch and host processor. More specifically the request message from the client to the host and the control message from the host to the switch is shown. The transmission of video packets in response to the control message from the switch to the client is also shown.

Shown in FIG. 7 is a request message 6 being sent from client 20 through switches 60 of the network to host 10. This request message will preferably be a remote procedure call made by a client invoking the video delivery procedure on the host with several parameters. The first parameter of the request message will be the name or index of the video file requested by the client, selected from a list of available video files provided to the client by the server, earlier during the execution of an interactive multimedia application running on a distributed computing environment on the clients and servers. A second parameter in the request-message will specify an offset relative to the start of the video file from where the playback of the video File should start. A third parameter in the request message specifies on offset, either relative to the start of the video file or relative to starting offset, at which the play back of the video file should end. A further parameter will specify whether the offset in the third parameter is relative to start of the video file or relative play back start position. The offsets in the second and third parameters may be represented as time or number of data bytes. The remote procedure calls are well known in the art, so the request messages will not be discussed further here. See [8], which is hereby incorporated by reference. The host processes the request message and determines, as described below, if the requested video content is stored in one of the network switches. If so, the host sends control messages 8 to the switches containing the requested data. See FIGS. 2 and 6. In response to the control messages, the switches retrieve the video packets specified in the control messages and delivers these packets to the client.

Figure 2A:
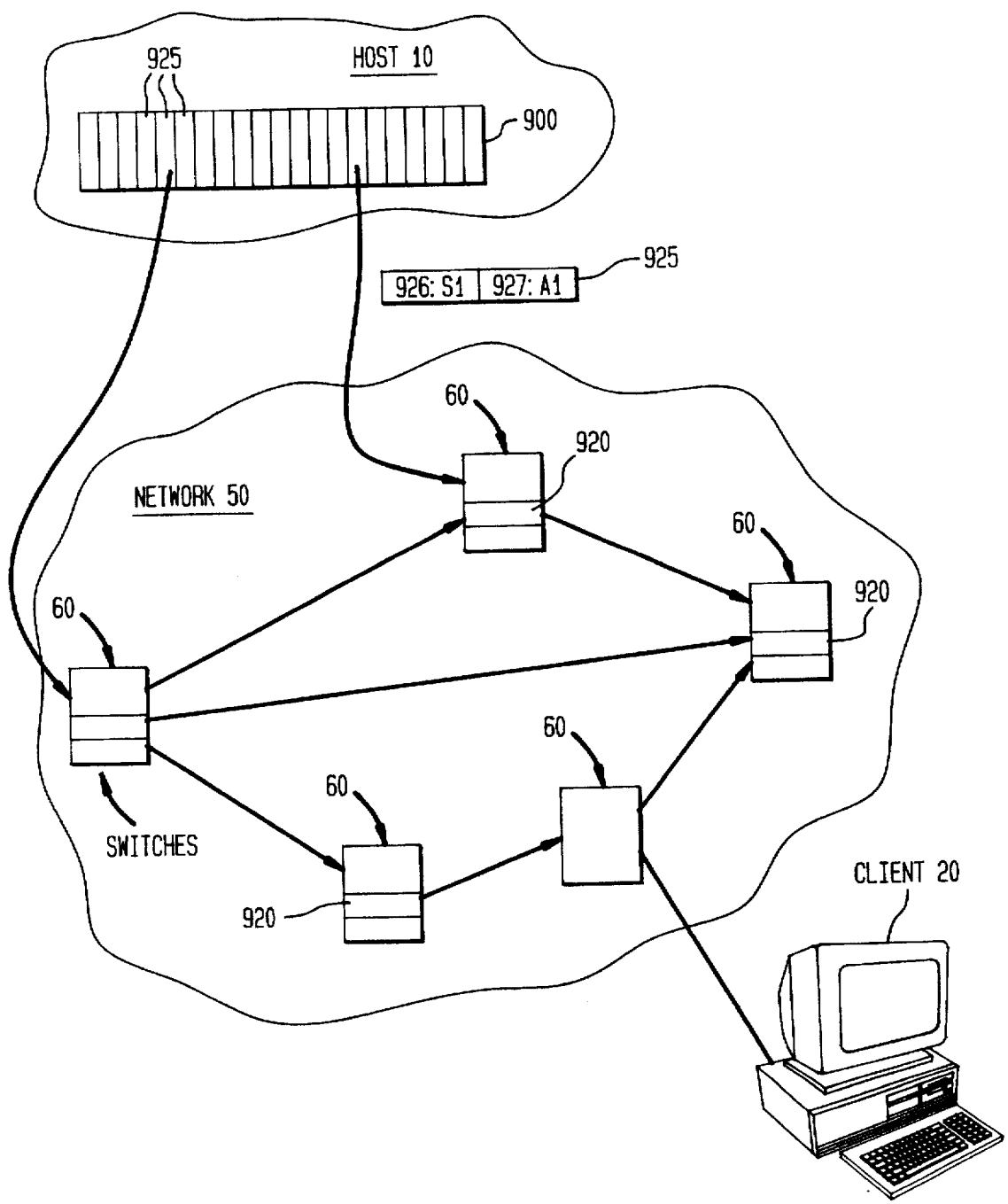
FIG. 2A schematically illustrates the environment in which the invention is implemented, and the off-loading of data in switches of the network with pointers to the off-loaded data being maintained in the host.
Figure 2B:
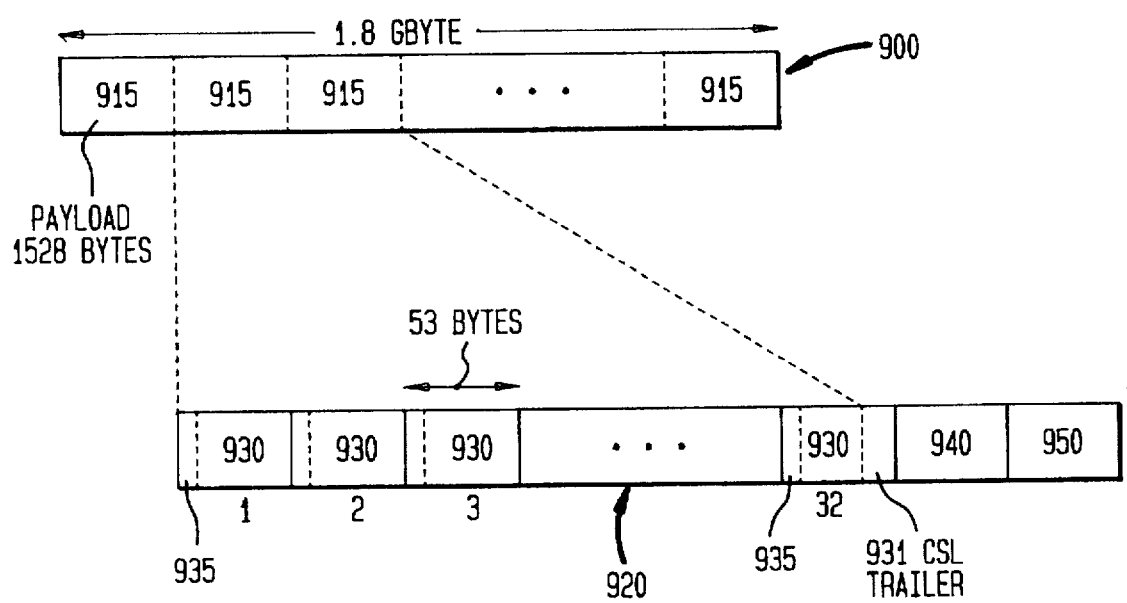
FIG. 2B schematically illustrates the preprocessed packets which are derived from the video content.

FIG. 2A schematically illustrates a high level view of the system of this invention comprising host 10, clients 20, network 50 having a plurality of switches 60. To off-load the video content 900 (see FIG. 1) from the host or application server, which is usually a general purpose computer, we partition the video content 900 into a fixed size payloads 915 for creating video messages 920. See FIG. 2B. The payload size will be typically 1 Kbyte to 16 Kbyte, and in our embodiment we choose it to be 1528 Bytes. A payload of that size fits in 32 ATM cells 930, as shown in FIG. 2B. Each payload in the host or application server is replaced with a pointer 925 comprising of a network switch address 926 and the address of the message 927 in the switch. See FIG. 2A. The size of each such pointer is expected to be between 8 to 16 bytes. The video message 920 itself, now represented by a pointer 925 in the host, is stored in the switch 60 specified by the switch address component 926 of the pointer, at the message address specified in the pointer, as shown in FIG. 2A.

Since a file in the host comprising video content 900 is different from a file containing pointers 925 to video messages stored in the switches of the network, and the host has to use these files differently, the host uses a naming convention to assign one file type to all files comprising video content 900, and another file type to all files comprising of pointers to video messages stored in the network. Alternatively, the host can maintain a table listing all video content files and having an entry to indicate whether the file is video content or a list of pointers to video messages stored in the switches of the network.

Prior to storing the video content in a switch in the network, an eight byte ATM AAL5 convergence sublayer trailer 931 is appended to each payload 915, and the resulting bytes are reformatted into a video message 920 comprising of a sequence of ATM cells 930, as shown in FIG. 2B (In ATM networks, the network packets are called cells). Similarly, in a non ATM packet switched network, segmentation will be performed, if necessary, after the transport layer header/trailer is appended to the message, and network layer header and/or trailer will be appended to the segments prior to their being stored in the switch.

The fields in the network/transport/adaptation layer headers or trailers that can be precomputed at the time when the packet is being stored in the switch are precomputed and stored in the ATM cells at appropriate locations. In our case, the last packet for each message has an 8 byte convergence sublayer (CSL) trailer 931, in which the message length and checksum fields are precomputed, and the user-to-user indication (UU) and the common part indication (CPI) fields are set to zero, before the message is stored in the switch. These four fields represent the entire ATM AAL5/CSL (Convergence Sub-Layer) trailer. In the five byte header 935 in each ATM cell, only the last half byte is precomputable. These four bits comprise of the cell loss priority and the payload type, where the payload type also includes the 1 bit end of datagram field for the AAL5 SAR (Segmentation and Reassembly) layer. The ATM cells 930 with the header/ trailers partially precomputed as discussed above comprise the preprocessed video packets.

A video message 920 is the basic unit of flow control in the network, and consequently the basic scheduling unit for access to video memory and transmission of video data to the client. If an ATM cell retrieved from the video memory is not the last cell of a video message, the switch automatically schedules the retrieval of the next cell in the video message. The ATM cells of a video message are received by the client as a burst because the switch does not insert delays between the transmission of two ATM cells of a video message to control the transmission rate. The size of the video message has to be restricted for efficient operation of the network, to provide quick response time in interactive multimedia applications, and to minimize the buffer requirements at the client. However, short video messages would require frequent interactions between the host and the switches, requiring more powerful (and therefore more expensive) hosts, and more hardware in the switches to handle the increased number of control messages.

The above problem is resolved by enabling the switch to transmit several video messages to a client in response to a single control message received from the host. To support this capability additional information is created for each video message and stored with the video message in the network switch. This information consists of the link field 940, and the flow control field 950, see FIG. 2B. The link field in each video message 920 of a video stream 900 points to the next video message of that stream. Thus, the host or application server can send a control message to a switch specifying the address of the starting message and the number of subsequent messages to be sent, and the switch can then retrieve the subsequent messages using the link field 940. The flow control field contains the playback time of the next video message, referenced from a fixed starting point. Thus the switch can insert the correct delay between the transmission of two video messages of the same stream, to maintain the proper rate for delivery of video of the data to the client.

Modified Switch Hardware and Its Operation

In this section we first briefly discuss the design of a shared buffer switch which will form the basis of our embodiment, and its operation. Then we will describe the modifications which give the switch the capability of storing video and dispatching specified video packets to specified clients when instructed by the host. When we first described the switch without the modification, it will not directly relate to this preferred embodiment; however, the connection with this embodiment will become clear in the description of the modified version of the switch which appears below.

A Shared Buffer Switch

Figure 3:
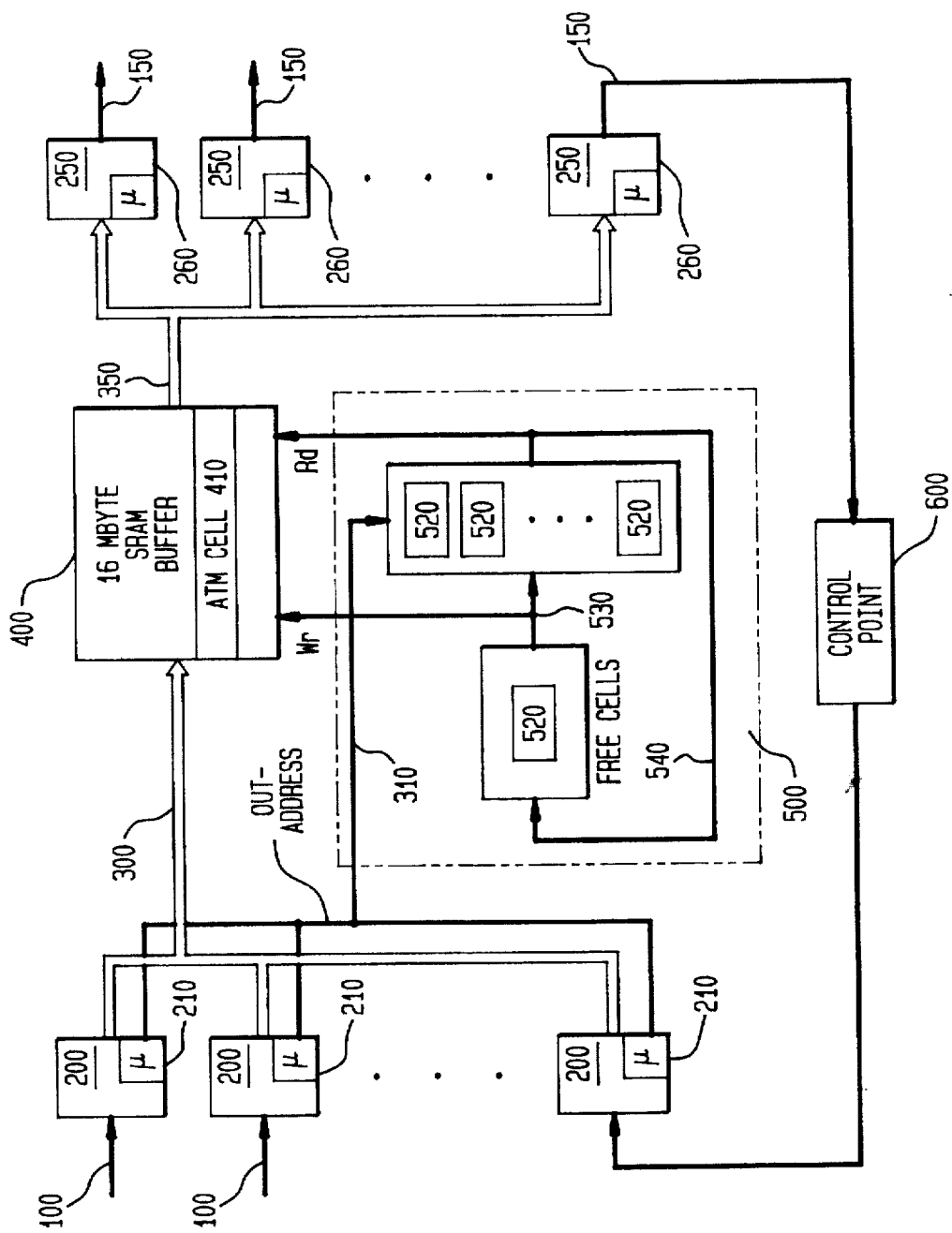
FIG. 3 schematically illustrates a shared buffer switch which will be modified to store preprocessed packets.

FIG. 3 shows the high level architecture of a shared buffer switch. At its core is a large shared memory 400, with an input bus 300 for data to be written into the memory, and an output bus 350 for data being read from the memory. Both the input bus 300 and the output bus 350 are 53 Bytes wide in our embodiment, the size of an ATM cell. The packets (ATM cells) arriving on each of the high speed serial links 100 are processed in an input adapter 200 to examine the ATM cell header to determine which switch output 150 the packet must be routed to, and to swap the address (VPI (Virtual Path Identifier) and VCI (Virtual Circuit Indentifier)) fields of the cell in accordance with ATM networking methods. See [1]. After this processing, the input adapter 200 deserializes the packet into a single 53 byte wide word and places it on the input bus 300, and simultaneously places the address of the switch output 150 to which this packet must be transferred to on out-address bus 310. The packet is thus stored in the shared memory 400 at a location decided independently by a controller 500. The bus bandwidth matches the total bandwidth of all the incoming lines.

The shared memory 400 is organized as an array of 53 byte words 410, i.e., the basic unit of data transfer for read and write operations is 53 bytes, the size of an ATM cell. To improve the readability of subsequent discussion, we will refer to these 53 byte words in the shared memory as cells. Each output link 150 has an output adapter 250 associated with it. The adapters 250 for all output links are connected by the time multiplexed bus 350, similar to the bus 300 shared by the input adapters 200, to the shared memory.

A list of free cells in the shared memory 400 is maintained by the control section 500. This list is maintained in the FIFO queue 510. Each output link 150 has a FIFO queue 520 associated with it in the control section 500. These queues are logically distinct, but could be implemented using a single physical memory. The queue 520 stores the addresses of the ATM cells which the corresponding output adapter must retrieve from the share memory and deliver to the network. To store an incoming packet into the shared memory the address of a free cell is obtained from the list of free cells 510, and placed on the write address bus 530. At the same time this address is dequeued from the list of free cells 510, and enqueued into the address queue 520 selected by the out-address bus 310 which carries the address of the switch output 150 to which the packet is being sent. The output adapters 250 dequeue the addresses of packets stored in the shared memory to be transmitted to their output links 150, from their corresponding address queue 520 in the central controller 500, read the packet from the shared memory, serialize it and transport it over the link 150. The address of the packet dequeued from the address queue 520 is placed on the read address bus 540, and at the same time recycled into the free cells list 510.

Bandwidth of the input bus 300 is equal to the combined bandwidth of all incoming links 100. So, no arbitration is required for the input bus 300. Instead, the bus is operated in a slotted manner, with each of the N input adapters accessing the bus in every $N^{th}$ slot. In our current embodiment, a slot is a clock cycle. The output bus 350 is operated in a similar manner, and the input and output adapters interact with the central controller only in the clock cycle in which they gain access to the input or output buses. Also shown in each input adapter 200 is a microprocessor 210 and in each output adapter 250, a microprocessor 260. These are used to perform various link monitoring and service functions, and the ones in the input adapters are also used to manage the routing tables. They will also be used advantageously in subsequent discussions to service the video streams being delivered from the switch. The control point 600 is a work station or PC class general purpose computer used to perform network management functions such as maintaining the database of topology and link states and link utilizations of the whole network, to allocate labels for new circuits being established, and to initialize and monitor the microprocessors 210 and 260. This too will be used advantageously in subsequent discussions to allocate and reclaim the memory used for storing the video content.

Finally, for ease of discussion we chose to describe the shared buffer switch as having separate input and output adapters with a microprocessor in each of them, and separate input and output buses. In a compact implementation, these two adapters could be combined in a single card, with one microprocessor servicing both adapters, and a single bus with twice the bandwidth of the input and output buses could replace the input and output buses.

Figure 4:
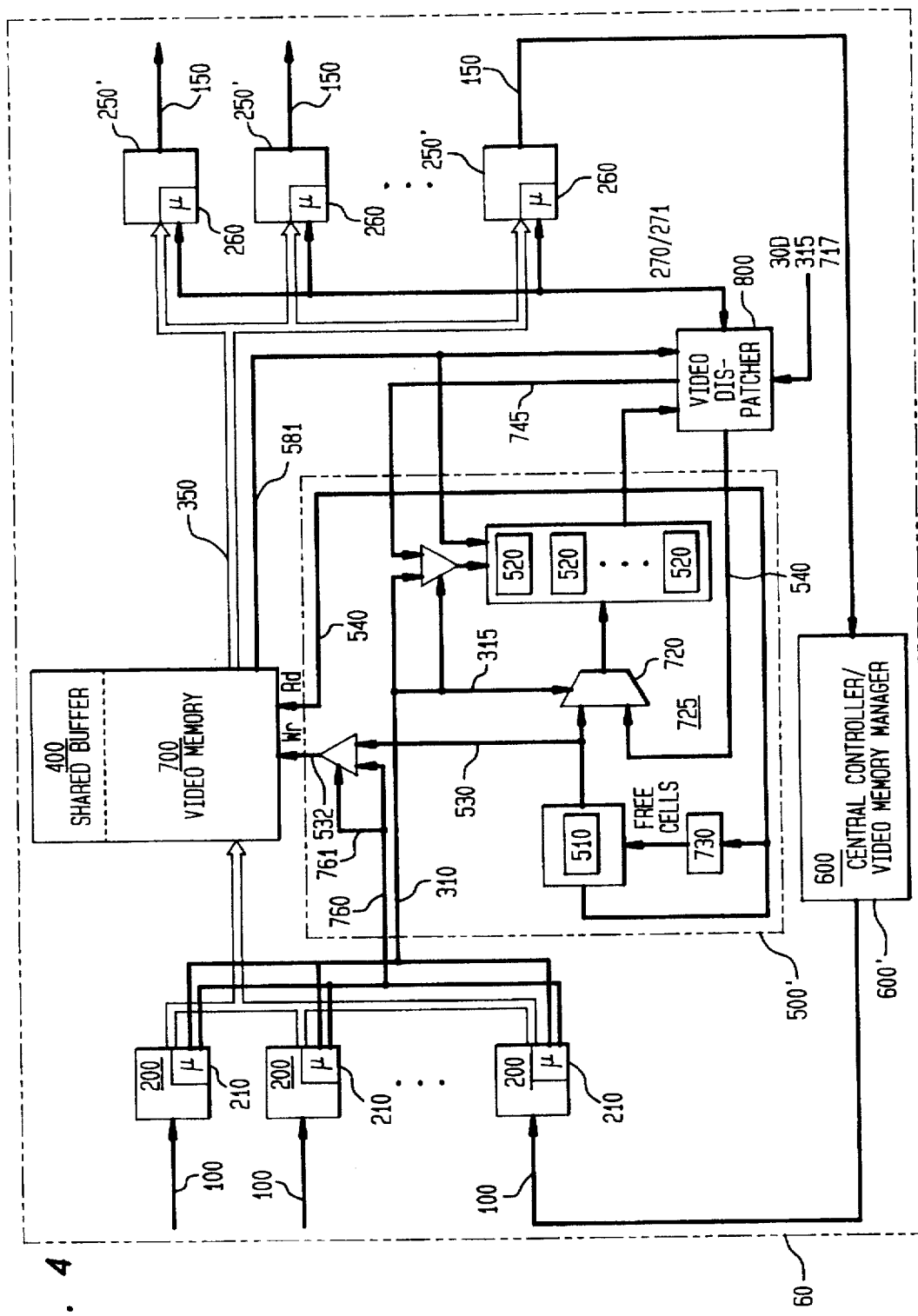
FIG. 4 schematically illustrates the modified shared buffer switch to store the preprocessed packets.

Shared Buffer Switch Modified to Store Video and to Deliver It to Clients on Receiving an Instruction from the Host FIG. 4 illustrates the hardware modifications required in the shared buffer switch to give it the capability of storing video messages 920, and the capability of delivering a specified group of messages to a specified client 20 on receiving a control message 8 from the host 10 to do so. To store the ATM cells 930 of a video message in the shared buffer switch of FIG. 4, the shared buffer 400 is augmented with video memory 700. The shared buffer 400 and the video memory 700 share the input and output buses, the address bus and the write enable control. The link field 940 and the pace control fields 950 are stored separately in a tag memory 810 which resides in the video dispatcher 800. See FIGS. 4 and 5.

Figure 5:
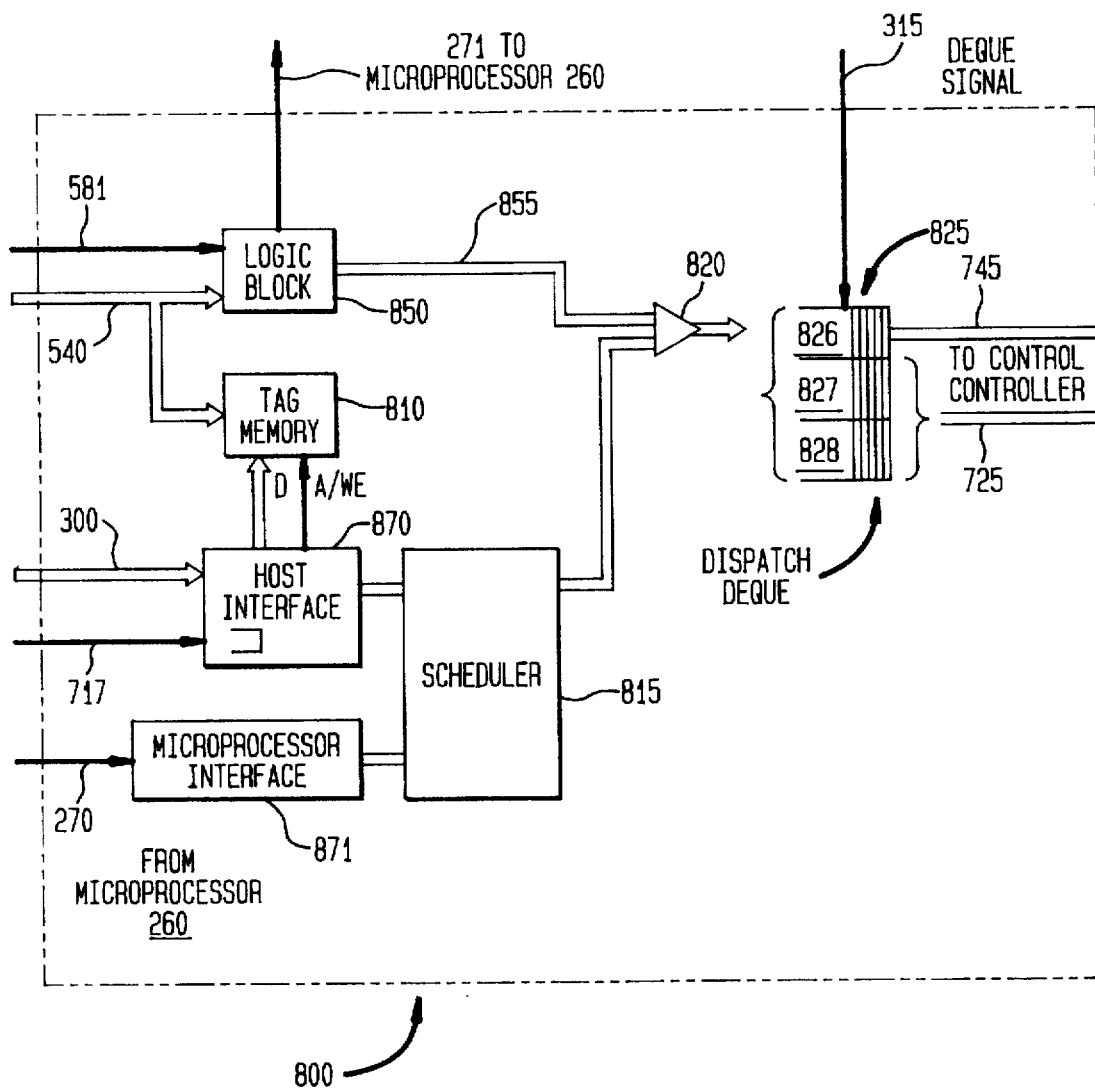
FIG. 5 illustrates the details of the video dispatcher unit of the modified shared buffer switch.

The video dispatcher 800 is shown in some detail in FIG. 5. It can receive ATM cells comprising the control message 8 (FIGS. 6 and 7) directly from the host 10. These control messages are received by interface logic 870 from the input bus 300 when an input adapter 200 activates the signal 717. Each control message 8 specifies the address of the first ATM cell in a group of video messages, time at which the first video message in the group should be delivered, number of video messages in the group, an output adapter address, and a stream number, as shown in FIG. 6, and requires the video dispatcher to request from the central controller 500' the delivery of all ATM cells in the group to the specified output adapter 250' by issuing request for one ATM cell at a time to the central controller 500'. The request to read the ATM cells is enqueued in the dispatch queue 825 through multiplexor 820 by the scheduler 815 at the times specified in the control message. The video dispatcher also receives similar instructions, without the encapsulation in ATM cells, from the microprocessors 260 in the output adapters 250' on bus 270 which are received by interface logic 871 in the video dispatcher. As with the central controller, the input and output adapters interact with the video dispatcher only in the cycle in which they access the input bus 300 or the output bus 350, therefore, there is no arbitration required on the buses 270, 271, and 717, whose use is discussed in detail later. Once the delivery time of the first message of a group of messages is specified to the video dispatcher, the delivery time of each of the remaining messages can be obtained from the flow control field of the previous message stored in the tag memory.

The video dispatcher has a FIFO dispatch queue 825 to store the read requests for ATM cells from the video memory which can not be enqueued in the central controller 500 immediately due to contention from the input adapters 200 for the address queues 520. Each entry in the dispatch queue 825 has three fields, the output adapter address field 826 indicates which output adapter 250' receives the cell read from the video memory 700 by this request, the stream-id field 827 specifies the video stream on the adapter specified in field 826 for which the cell is read, and the video memory address field 828 specifies the address in the video memory of the cell to be read. When a bit on line 315 of the out-address bus 310 of FIG. 4 is inactive, indicating that no input adapter is interacting with the central controller, an entry is dequeued from the dispatch queue 825. The contents of the output adapter address field 826 are placed on bus 745 to select the address queue 520 in the central controller. The remaining fields, the stream-id field 827, and the video memory address 828 are placed on bus 725 to be multiplexed with the inputs to the address queue 520, and stored in the address queue 520 selected by the address on bus 745.

The video dispatcher also monitors the address of all cells read from the video memory, and the output adapter and stream-id to which they belong, on the bus 540 in cell address monitor 850. Line 581 is used to indicate that a cell was read from video memory. If the cell just read from the video memory is not the last cell of a message, then a new request is generated by incrementing the cell address in incrementor 855, and it is sent to the dispatch queue 825 through multiplexor 820. If the cell read from the video memory is the last cell of a message, then the link control field and the flow control field of that message are read from the tag memory and, together with the stream-id received from bus 540, are sent to the output adapter 250' receiving this message. This information is sent on bus 271 and is intended to trigger the microprocessor 260 in the adapter to request a new message from the video memory.

To interact with the video dispatcher 800, and with the input adapters 200 to load video content, the central controller 500 is modified (500' of FIG. 4) as follows. A multiplexer 720 is provided between the free cell list 510 and address queues 520. One input of this multiplexer is the bus 530, carrying the address of the free cell in shared buffer 400 being written by some input adapter in the current cycle, which must be queued in the address queue 520 addressed by the out-address bus 310. The other input is the bus 725 from the video dispatcher 800 carrying the address of a cell in the video memory and a stream identification number, both of which must be queued in the address queue 520 identified by bus 745. One bit on line 315 of the out-address bus 310 indicates that the out-address is valid, and is used to give higher priority to bus 530 and controls the multiplexer 720 accordingly. The bit 315 also controls the address multiplexer 740 in the central controller to use the out-address 310 when bus 530 is selected, and to use the address generated by video dispatcher on bus 745 when the content to be stored in the address queue 520 is selected from bus 725. It should be noted that in the current embodiment, the video dispatcher is blocked from writing into an address queue 520 even when contents of bus 530 are to be written into a different address queue 520. By providing more complex logic, this drawback can be avoided. Addresses dequeued from address queue 520 are recycled into the free buffer list 510, only when the address are that of shared buffer 400. Control logic 730 checks whether the address on bus 540 is in the range of addresses for shared buffers and enables only the address in this range to be enqueued in the free cell list 510. Since the addresses for the video memory 700 will have many more bits than those for the shared buffer 400 and are tagged with a video stream number, the address queues 520 and the bus 540 are expanded.

Loading Video Memory from the Host

To load information into the video memory 700 from the input adapter 200, a load address bus 760 together with a control bit 761 is used. The microprocessor 210 in a input adapter 200 will receive messages from the host to load a sequence of ATM cells contained in the message starting from an address in the video memory, the address being also specified in the message. In response, the ATM cells will be placed on the input bus 300, and the address in video memory where they should be stored is placed on the load address bus 760, and the control bit 761 is activated. The control bit 761 controls the multiplexer 710 in the central controller 500', allowing the write address 532 for the video memory to be selected from the load address bus 760 rather than the free cell list on bus 530. When the control bit 761 is active, the control bit 315 is inactive allowing video dispatcher access to the address queue 520.

The general purpose computer 600', used as control point in the shared buffer switch, also functions as the video storage manager to allocate and reclaim video storage. The host computer or application server interacts with the video storage manager to request a block of free video memory or to return a block of video memory. Once the video storage manager allocates a block of video memory to a host and notifies the host with the address range for that block, the host can write directly into the video memory allocated to it, as explained in the preceding paragraph, without further involvement from the video storage manager. The command from the host to write into the video memory 700 can be sent directly to the microprocessor 210, or indirectly through the control point processor 600' which will then forward the command to the microprocessor 210.

Since the video storage manager is a general purpose computer, the communication between it and the host can take place using any of the standard reliable transport protocols, and the desired security and authentication measures can be used. The messages from the host to the microprocessors 210 in the input adapters 200 can also be delivered on secure links with the distribution of keys being handled by the video storage manager and the decryption of messages being performed in the microprocessors themselves. The two common types of messages sent from the host to the microprocessor 210 are to load video memory and to send commands to video dispatcher. If these command messages contain appropriate information to send an acknowledgement back, the microprocessor 210 can be programmed to send an acknowledgement back to the host. Fragmentation in the video memory can be handled without requiring compaction by using the buddy system method proposed for allocating main memory in multiprogrammed computers.

Delivering Video Data to the End User from Video Memory

As described above, the control message 8 sent from the host for dispatching a group of video messages is intercepted by the input adapter 200, which then forwards this command to the video dispatcher 800. For each ATM cell in this group of video messages, the video dispatcher submits a separate request to the central controller to read the ATM cell and deliver it to the correct output adapter. The output adapters have to fill in the VPI/VCI fields in the headers of the ATM cells read from the video memory before these cells are sent out on the output link 150. See below.

As an ATM cell is read from the video memory 700 and delivered to an output adapter 250' (see FIG. 9), the video dispatcher receives the stream-id for this cell from the bus 540 and forwards the stream-id to that output adapter on bus 271. Flow control and link fields 940 and 950 are also sent along with the stream-id when the ATM cell being delivered to the output adapter is the last cell of a video message. The output adapter completes the header of the ATM cell received at the same time from the video memory as described below.

The output adapter can generate an acknowledgement back to the host to indicate successful transfer of video messages. For efficient implementation in large servers, this acknowledgement must be generated in hardware using return address and other relevant information from the stream control table, unless the number of ATM cells in a group of messages is sufficiently large, and therefore, frequency of acknowledgements low enough to be handled by the microprocessor 260.

Preferred Implementation of the Video Memory

Figure 8:
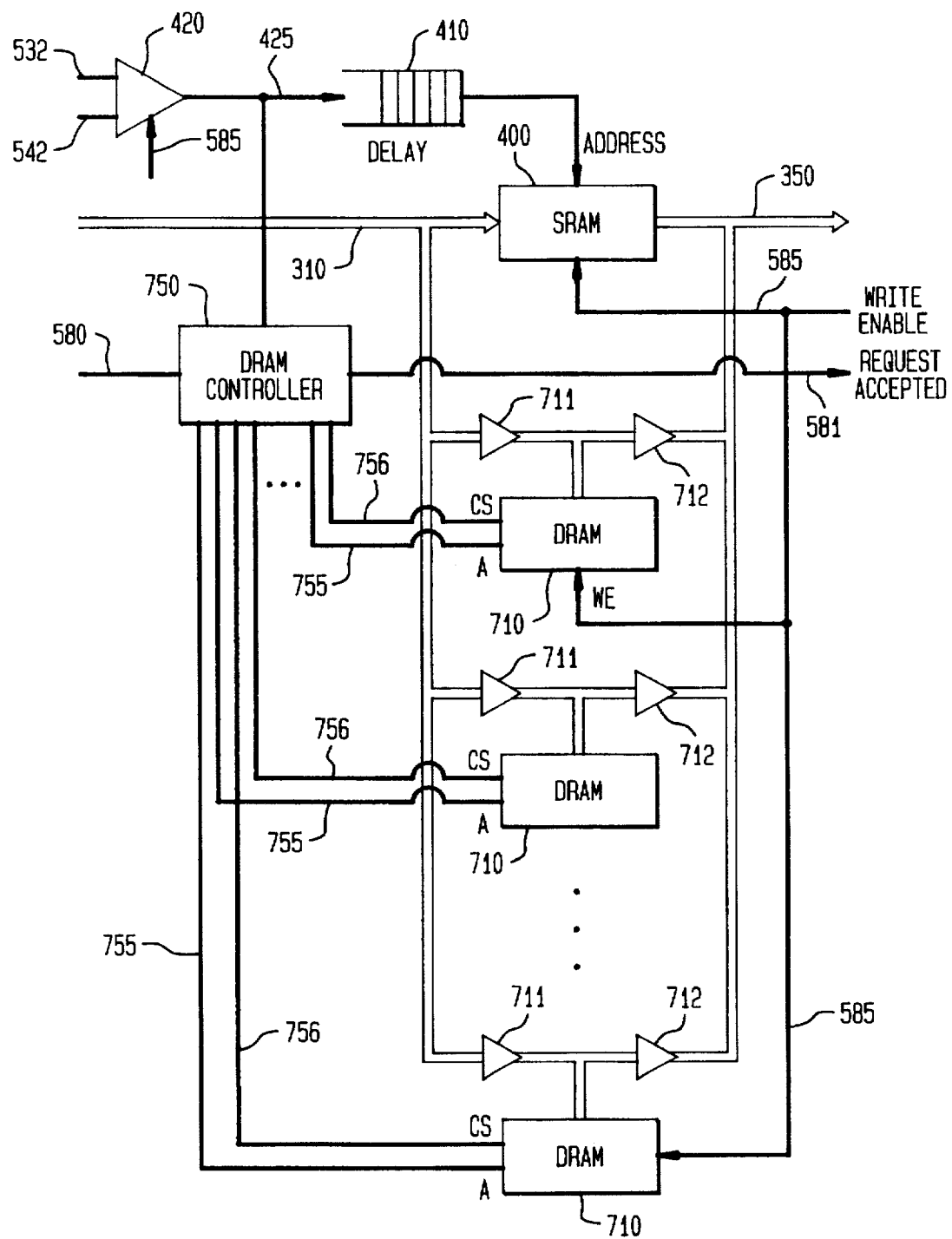
FIG. 8 is a schematic illustration of the preferred video memory used with this invention.

In our preferred embodiment the shared buffer 400 is implemented Static Random Access Memory (SRAM) modules. But since the video memory is much larger in size than the shared buffer, it cannot be implemented in SRAM technology due to cost, power and space constraints (the size of shared buffer is few Megabytes while that of video memory is of the order of hundred Gigabytes). Therefore video memory 700 is implemented from Dynamic Random Access Memory (DRAM) modules 710, as shown in FIG. 8. There would be preferably four to 16 DRAM modules, each module being 53 bytes wide. In our embodiment we use 4 modules. Since DRAM modules do not have separate data input and data output ports like the SRAM, tristate drivers 711 and 712 are used to connect the data ports of the DRAM modules to the input bus 300 and the output bus 350. The multiplexor 420 is used to multiplex the read address 540 and the write address 532 on the address bus 425. A write enable signal 585 controls the multiplexor 420 and also provides the write enable control for SRAM and DRAM modules.

The DRAM controller 750 uses the address received from address bus 425 to generate the address signals and chip select signals for each DRAM module. In addition, it generates the row address select, and column address select signals for the DRAM modules and provides the memory refresh signals.

The data access time for SRAM is much shorter than that for DRAM. The addresses provided to the SRAM are delayed in the delay element 410 to enforce equal access time for both the SRAM and the DRAM and thus to avoid contention for the output bus 350. If a request to access a DRAM module can not be accepted immediately, due to that DRAM module being busy with a previous request, a request accepted signal 581 is turned off to prevent the address from being dequeued from the address queue 520, and to signal to the video dispatcher 800 that no video packet is being sent to the output adapters.

The ATM cells in the video memory are interleaved across the DRAM modules.

Output Adapter

Figure 9:
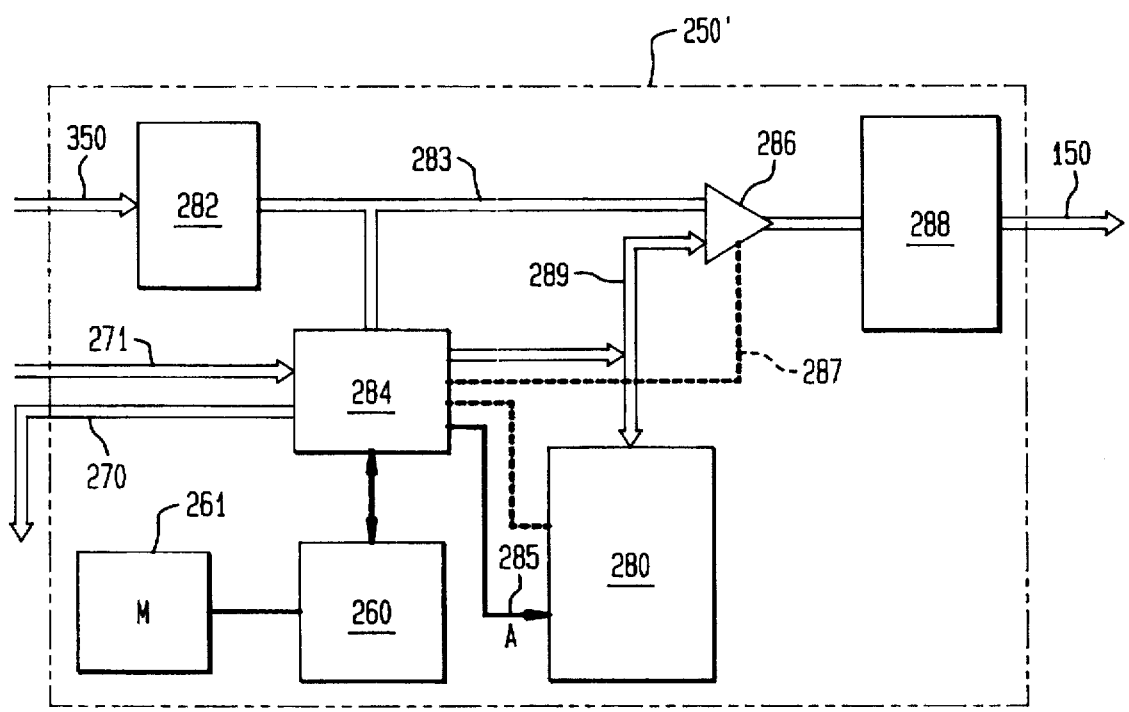
FIG. 9 is a schematic illustration of the modified output adapter of this invention.

The high level architecture of the modified output adapter 250' is shown in FIG. 9. ATM cells are received from the shared buffer or video memory on the output bus 350, once every N clock cycles, where N is the number of output adapters. Logic block 282 serializes the ATM cell received on output bus 350 on to a 32 bit wide or 16 bit wide bus 283. Logic block 284 monitors bus 271, driven by the video dispatcher 800, if the ATM cell on bus 283 is coming from the shared buffer 400 in which case it is passed unmodified through the multiplexor 286 to output link interface logic 288, which finally transmits the cell on the output link 150.

If the ATM cell on bus 283 is coming from video memory, bus 271 contains a stream-id for that cell. The stream-id is placed on bus 285 by the logic block 284 to index into the stream control table 280 to retrieve the header information for the ATM cell. This header information is transferred via bus 289 to multiplexor 286 which substitutes it in the ATM cell being received on bus 283. Control signal 287 generated by logic block 284 causes the substitution of the header to occur.

The logic block 284 also scans the header of each ATM cell received from the shared buffer 400, to determine if the ATM cell is addressed to the microprocessor 260 on the output adapter, in which case the cell is not transferred to the link interface logic 288, but is sent to the microprocessor 260 instead. This is the primary mechanism for the host 10 to communicate with the microprocessor 260 to manage the stream control table 280. Two key commands sent by the host to microprocessor 260 are to create a new entry into the stream control table, and to delete an entry from the stream control table (see FIG. 7). The microprocessor 260 uses local memory 261 to store its program and data, and interacts with logic block 284 to effect changes in the stream control table. The host can send commands to manage the stream control table either directly to the microprocessor 260, or through the control point processor 600.

It was mentioned earlier that the switch must deliver multiple video messages to a client in response to each control message received from the host. One way of ascertaining was to have the host request the delivery of multiple video messages in a single control message as discussed earlier.

Another way is to specify a message count, or stopping time, or a stopping link pointer value for each stream in the steam control table. The host starts the stream by by sending a control message to the video dispatcher, specifying the delivery of first video message. As the last ATM cell of a video message is processed in the output adapter, the message count for the stream stored in the stream control table is decremented, or if the stopping time for the stream is specified instead then the stopping time is compared with the delivery time of the, or the stopping link pointer valve is compared with the link field received on bus 271. If the stopping condition is met, an appropriate acknowledgement is generated and sent to the host. Otherwise the link field and the flow control field are used to generate a new request to read the next video message for that stream, and the new request is sent to the video dispatcher on bus 270. The host, upon receiving the acknowledgement or the stopping condition can continue the delivery of the video stream by sending a command to the output adapter to reset the stopping condition in the stream control table, and sending a control message to the video dispatcher to send the video message which follows the last message delivered for that stream.

Providing two different methods, as described above, for the host to request the delivery of multiple video messages, may seem unnecessary at first. But the first method, where the host requests multiple video messages in the control message sent directly to the video dispatcher, allows the short video streams to have a very low latency startup, as compared to the second approach where the startup latency is large because the host has to first setup the correct stopping condition in the stream control table before it can initiate the delivery of video messages to the client. However, the disadvantage of the first approach is that once the host sends a control message to the switch to send a specified number of video messages to a client, the host cannot interrupt the switch from completing the delivery of all the video messages, nor can it change the playback mode before all the video messages have been delivered. On the other hand, the host can modify the stream control table any time to change the playback mode, stopping condition, or to specify a new starting point. The first approach should be preferred if the application requires the host to interact with the switch frequently, because this approach offers low overhead and stream startup latency. The second approach should be preferred when the interaction between the host and the switch are infrequent because it allows the host to retain control over the transfer of video messages.

Supporting Backward Play, Fast Forward and Rewind

In the preceding discussion we addressed the method of delivering video for regular play. A single link field and a single flow control field was used to accomplish this. To support multiple playback modes some video messages would require multiple link fields and multiple flow control fields. In this section we first describe how video messages are linked together, often using multiple links in each video message, to support multiple playback modes. Each link field is always associated with its own flow control field which specifies the delay the switch should introduce when scheduling the video message pointed to by that link. Then we describe a space efficient way of storing the link and flow control fields in the switch.

In a video stream compressed by MPEG algorithm the compressed frames are of three types, Intra coded, Predictive coded, and Bidirectionally predictive coded. Intra coded frames (I-frames) can be decoded without additional information, but the decoding of Predictively coded frames (P-frames) requires the decoded I-frame which precedes it. The decoding of bidirectionally predictively coded (B-frames) requires the decoded I- or P-frame which precedes it as well as the decoded I- or P-frame which follows it.

FIG. 13a shows a sequence of frames (pictures) in a video stream. This is the order in which the frames arc captured and displayed, and we will refer to this order as the presentation order. However, one can readily see that the second frame which is a B-frame cannot be decoded until the 5th frame, which is the first P-frame or I-frame following this B-frame is decoded. Thus, the order in which the frames of a video stream arc decoded, referred to as the decode order, is different than the presentation order. In FIG. 13b, the arrows illustrate the decode order for the frames listed in presentation order from left to right. In our embodiment, the compressed picture frames in a video stream are stored in the decode order and thus sent to the client in decode order. In the video messages accessed by the forward links 941, the compressed picture frames appear in decode order.

To support the playing of video backwards, the compressed picture frames shown in FIG. 13c, listed from left to right in presentation order for forward playback, are sent to the client and decoded in the order shown by the backward link 942, and displayed by the client in the right to left sequence. When backward links are used to access the video messages, the compressed video frames will appear in the decode order for playing the video backwards as shown in FIG. 13c. Since video messages are of fixed size, the start and end of picture frames will not be aligned with the video message boundaries. Thus, whenever video messages are accessed in a sequence differing from the regular playback mode, as is the case for forward play, fast forward and rewind, the first and last video messages of a video frame will contain extraneous data. In this case either the client must be programmed to discard the extraneous data, or stuffing bytes must be used in the video message to align the picture frame boundaries with the video messages.

Backward links are not stored with video messages which do not contain the ending of a frame because for these frames the forward link and backward link are identical.

Fast forward and rewind functions are supported in the same manner as backward play. Link 943 (see FIG. 13d) links the last video message containing data of an I-frame to the first video message containing data of the next I-frame. Thus, when link 943 is used to access the data, and the I-frames are retrieved and delivered to the user at a rate faster than the rate at which I-frames are received by the client in regular playback, fast forward effect is achieved. Since in a regular playback, the client receives typically two I-frames per second, this scheme is useful if the fast forward speed is about 15 times the normal playback speed. To support fast forward at a lesser speed one could link all the I and P frames using link 944 as shown in FIG. 13d. Links 945 and 946, also shown in FIG. 13d, are used to support the rewind function in a similar manner at two different speeds. Once again, links 943 and 945 are present in video messages which contain the end of an I-frame, and 944 and 946 are present in video messages which contain the end of an I-frame or P-frame. When these links are not stored in a video message, the forward link is used. Finally, links 943 and 944 have their own flow control fields which can be shard by links 944 and 946 respectively.

Since each video message has a different number of link fields, it would be wasteful to provide storage for the maximum possible number of link fields in each video message. To minimize the storage required, the link fields together with the flow control fields are stored compactly in the tag storage in the video dispatcher and fixed size pointers pointing to the links of each video message are stored in a Tag-pointer storage added to the video dispatcher. Now, the address of the video message is used to get a pointer from the Tag-pointer storage which in turn is used to access the links for that video message from the Tag storage. Each entry of the tag pointer storage has a mask entry, in addition to the pointer to the tag storage. The mask indicates which links are present.

Finally, to support the backward, fast forward, and rewind playback modes, an extra field is added to the control message sent from the host to the video dispatcher. This field specifies the playback mode. The playback mode information is carried along with the ATM cell address (and stream-id) on buses 725 and 540, and is stored with the ATM cell address in queues 540. Thus, when the last ATM cell of a video message is retrieved from the video memory, the link to the next video message and the corresponding flow control field is selected from the set of links stored for the video message just sent, by using the playback mode information.

Alternative Embodiments

The embodiment described in the preceding sections used a shared buffer switch design, video storage was implemented as an extension of the shared buffer itself, and video packets (cells) retrieved from the shared storage were forwarded to the output adapters of the switch. In this section we briefly three describe the alternatives to the above embodiments, each of which supports storing of prepacketized video information in the switches of the network.

Figure 10:
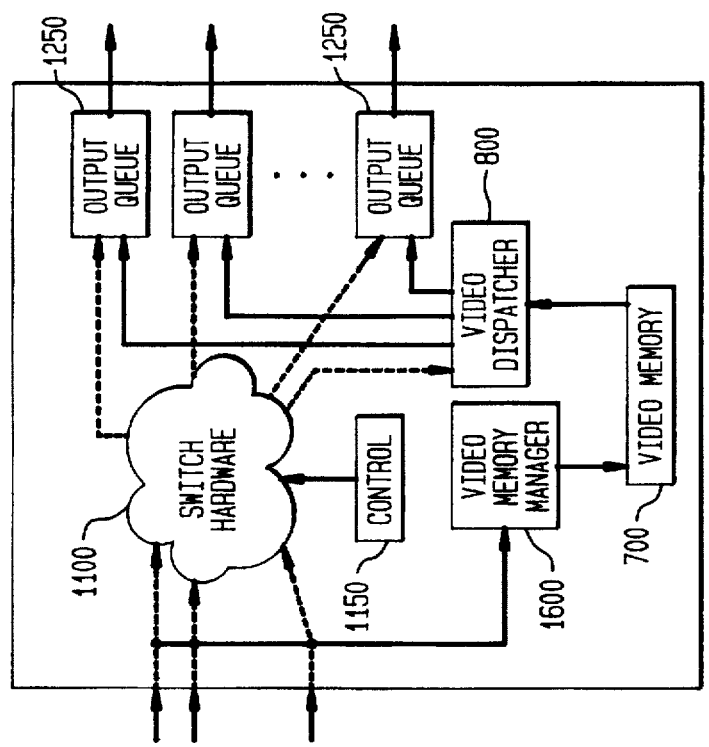
FIG. 10 is a schematic illustration of an alternate embodiment of the invention using a different switch which does not have a shared buffer.
Figure 10:
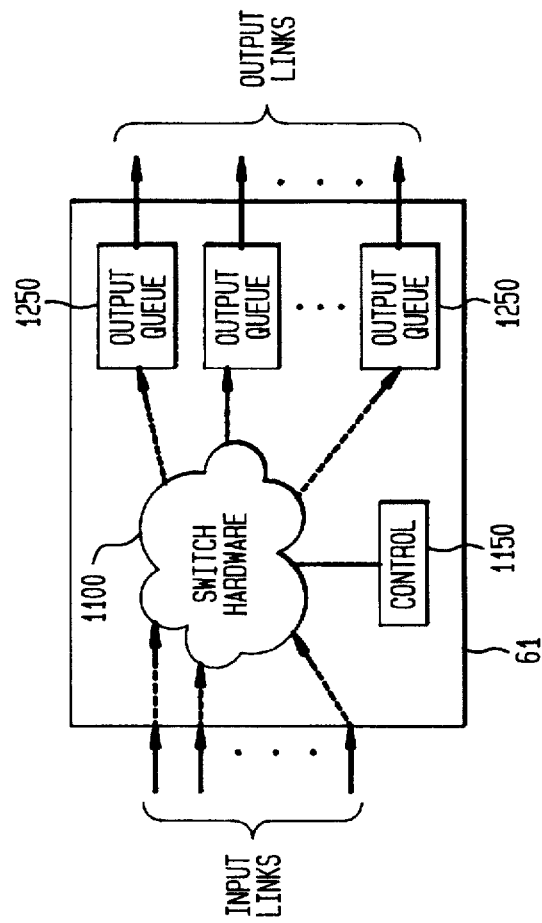

As long as buffers are provided in the output adapters of the switch, and processing power is available in these adapters to carry out the functions outlined for the output adapters, video storage can be attached to the switch even if it is not based on the shared buffer design. FIG. 10 illustrates the general method of integrating semiconductor memory to such switches. FIG. 10A shows a generic switch 16 with input links, and output queues 1250 in addition to the switch hardware 1100 and its control 1150. FIG. 10B shows that video memory 700 can be added to this switch by connecting it directly to the output queues through the video dispatchers. Unlike the preferred embodiment, the video data is now sent by the video dispatcher to the output adapter, and it goes to the output adapter on a different bus than the regular network traffic. The video memory manager 1600 now receives the video data too, and writes it into the video memory 700. Other than that, the details of operation are quite similar to the preferred embodiment based on the shared buffer switch.

Figure 11:
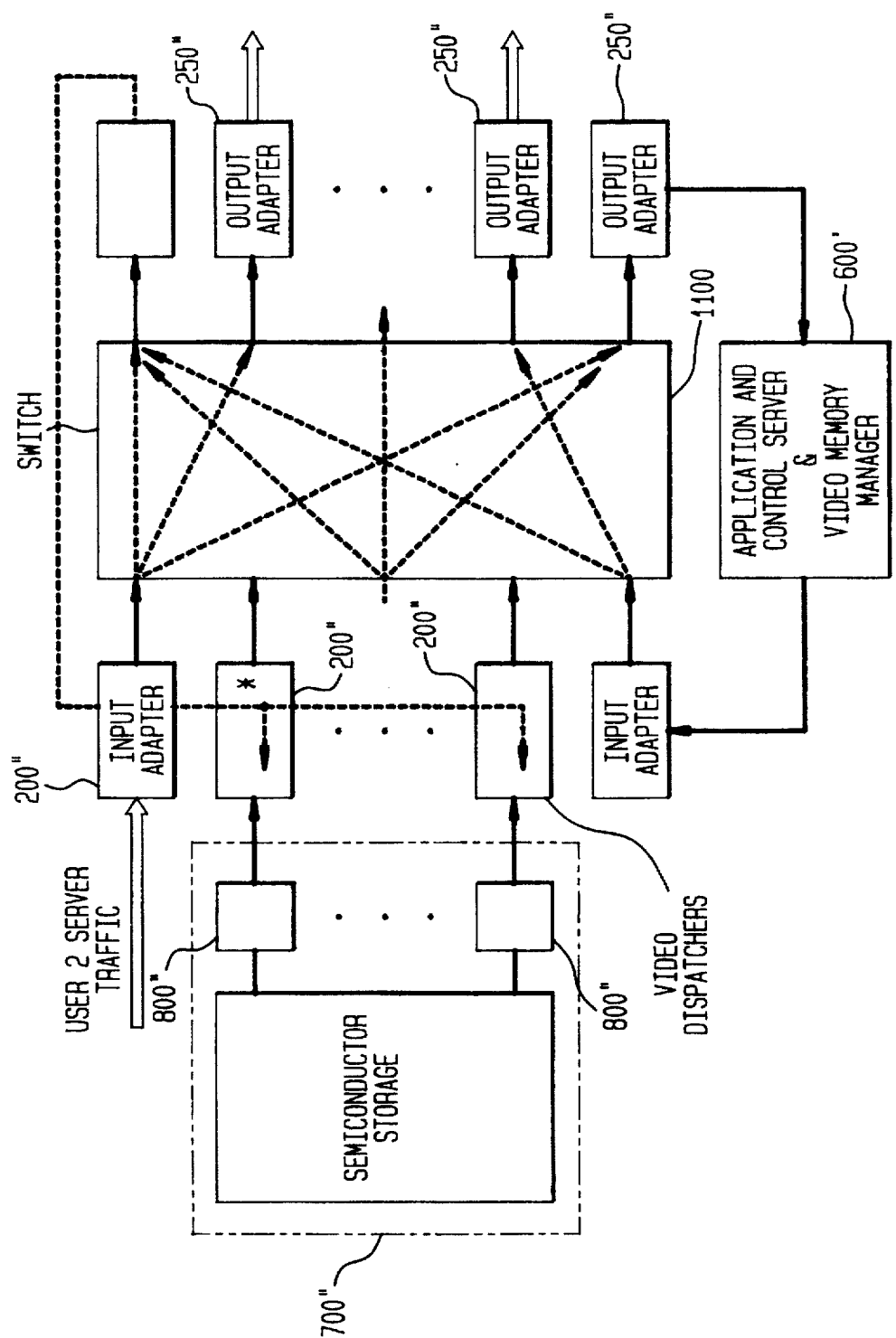
FIG. 11 illustrates an alternate method integrating semiconductor storage into the switch.

If the semiconductor memory can not be directly connected to the output adapters, as outlined in the preceding paragraph, then the input links of the switch can be used to connect the semiconductor storage, as shown in FIG. 11. Video storage 700" is now multiported with the ports 800" connected to the inputs of the switch. Input adapters are modified to incorporate video dispatch logic. Each of the modified input adapters 200" has the stream control table and handles the video dispatch function for the video streams accessed through it. Output adapters 250" are the same as 250 except for the fact that the interface to the switch hardware is no longer a wide shared bus. This approach has the disadvantage of requiring more switching hardware for supporting the same video throughput, because video moves through both input and output adapters. In the designs discussed previously, the switch could possibly have fewer input adapters, because traffic is predominantly video data integrated directly to the output adapters. When fewer input adapters are used, the saving is not only the hardware of the input adapters, but also from the use of smaller switch is possible.

Figure 12:
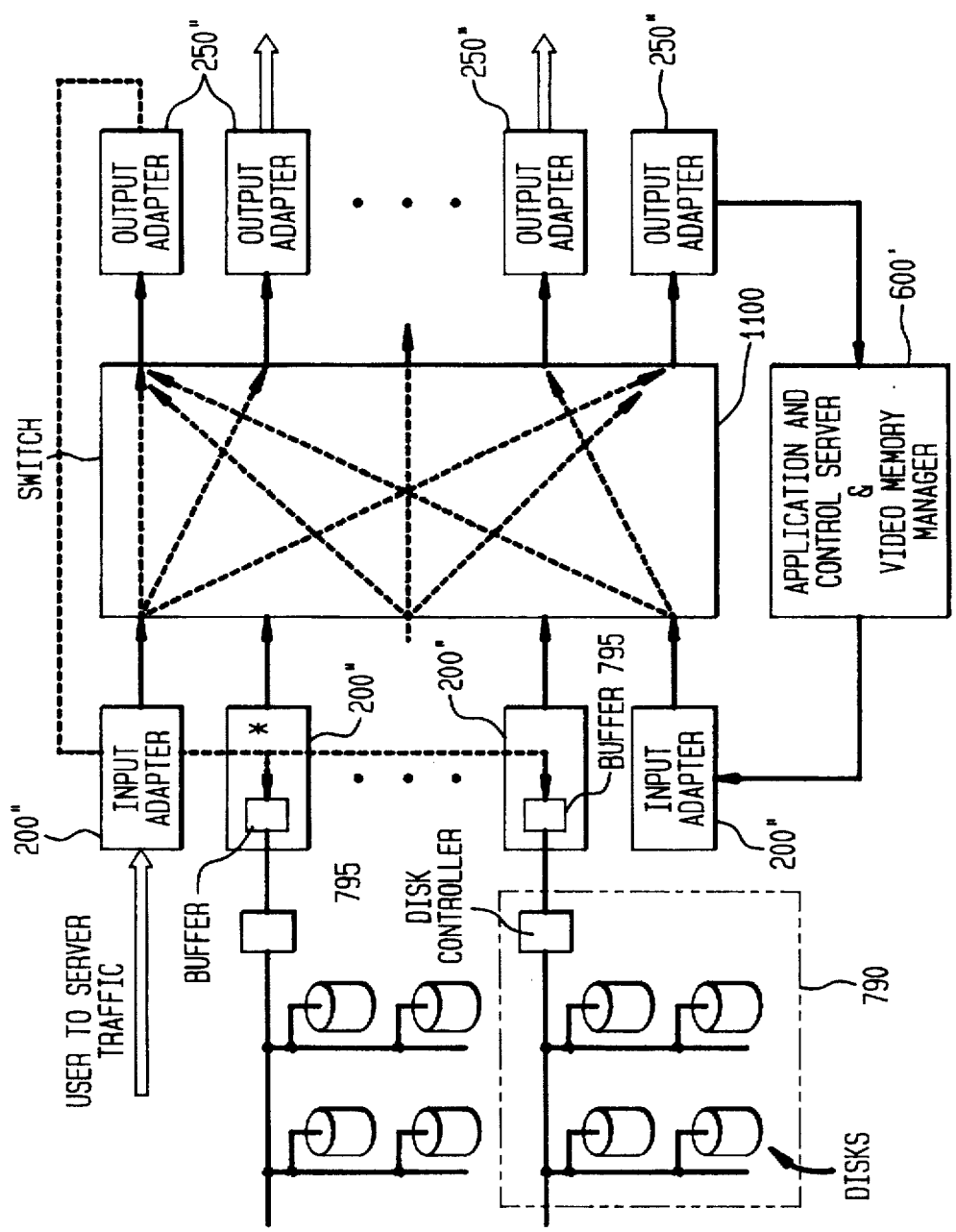
FIG. 12 illustrates the use of magnetic disk storage instead of semiconductor storage.

Finally, in all of the preceding designs, storage based on an array of disks 790 could be used in place of semiconductor storage, particularly if the number of streams to be supported is not too large. A small semiconductor buffer 795 prefetches the section of the video currently being accessed by the active video streams. This prefetching can be scheduled accurately because accesses to the video data are predominantly sequential. To the rest of the system, the buffer appears to be complete source of all video content. FIG. 12 illustrates this approach.

REFERENCES

[1] Craig Partridge, "Gigabit Networking," Addison Wesley Publishing Co., Reading, Mass. 01867, ISBN 0-201-56333-9, October 1993.

[2] M. J. Bach, "The design of the Unix operating system", Prentice Hall Inc., Englewoods Cliffs, N.J., 07632, ISBN 0-13-201799-7 025, 1986.

[3] H. M. Vin and P. V. Rangan, "Designing a multiuser HDTV storage server," IEEE Jour. on Selected Areas in Communications, 11(1), January 1993, pp. 153–164.

[4] D. Kandlur, M. S. Chen, and Z. Y. Shae, "Design of a multimedia storage server," In IS&T/SPIE symposium on Electronic Imaging Science and Technology, (San Jose, Calif. 1994).

[5] A. Dan and D. Sitaram, "Buffer management policy for an on-demand video server," IBM Research Report RC 19347.

[6] A. Dan and D. Sitaram, "Scheduling policy for an on-demand video server with batching," IBM Research Report RC 19381.

[7] R. Haskin, "The Shark continuous media file server," Proc. IEEE COMPCON 1993 (San Francisco Calif., 1993).

[8] W. Rosenberry et.al., "Understanding DCE," O'Reilley and Associates Inc., 103 Morris Street, Suite A, Sebastopol, Calif. 95472, ISBN 1-56592-005-8, September 1992.

Having thus described our invention, what we claim as new and desire to secure by Letters Patents is:

1. A data communications network, comprising:
   a. a communications system having a plurality of switches;
   b. a host processor connected to the communications network;
   c. a plurality of clients connected to the communications network;
   d. each of the switches having
      1) special memory means for storing preprocessed video packets,
      2) means for retrieving and dispatching copies of requested ones of the preprocessed video packets to a requesting one of the clients, and
      3) means for supplying information missing from the network protocol stack headers and trailers in the preprocessed packets.

said preprocessed video packets remaining stored in each of the switches even after copies of the requested video packets are transmitted to the requesting client e. and means which enable each of the switches to independently transmit preprocessed video packets to clients.

2. A method for distributing video, multimedia or other continuous media content, from a particular switch of a number of switches, where said content is stored in form of preprocessed packets before or without a current request for said content, to clients, said switches and clients being part of a data communications system further comprising a host processor and other switches, said method comprising the steps:

1. requesting said content, or a portion thereof, by sending a request for transmission from one of said clients to said host processor,
2. identifying said particular switch in which the requested content is stored,
3. transmitting a control message from said host processor to said switch, the control message indicating a request to send said content, or a portion thereof, from said switch to said one client, said control message not containing the requested content, or a portion thereof,
4. transmitting a copy of the requested content, or a portion thereof, in form of preprocessed packets from said switch through one of the output ports of said switch to said one client, such that said continuous media content can be re-assembled from said preprocessed packets by said client, while retaining thereafter said content in the form of preprocessed packets in storage at said switch, said switch having switching means and several output ports enabling the switch to independently transmit content to any of said clients requesting said content, or a portion thereof.

3. A method as recited in claim 2, wherein each of said preprocessed packets comprises payload from said content, and headers and trailers of network protocol stack.

4. A data communication system for transmitting video, multimedia or other continuous media content, from a switch where said content is stored in form of preprocessed packets before or without a current request for said content, to clients, said switch and clients being part of said data communications system which further comprises a host processor and;

1. means for requesting transmission of said content, or a portion thereof, by sending a request for transmission from one of said client to said host processor,
2. means for transmitting a control message from said host processor to said switch storing said requested content, the control message indicating a request to send said content, or a portion thereof, from said switch to said one of said clients, said control message not containing the requested content, or a portion thereof,
3. means for scheduling and transmitting a copy of the requested content, or a portion thereof, in form of preprocessed packets from said switch to said one of said clients, and
4. means enabling said switch which has switching means and several output ports to transmit content to any of said clients requesting said content, or a portion thereof, while retaining thereafter said content in the form of preprocessed packets in storage at said switch.

5. A method as recited in claim 4, wherein said content is removed from storage in said switch only if an independent control message requesting deletion of the said content is transmitted to latter said switch in said set, where said independent control message is independent of said request message.

6. In a data communications system comprising a communications network to which a host processor, a plurality of switches and a plurality of clients are connected, a method of delivering continuous media content upon specific request by one of said clients, said content being stored in form of preprocessed packets at least in one of said switches, the method comprising:

1. transmitting a request message from a client requesting said continuous media content, or a portion thereof, to the host processor for a copy of the respective preprocessed packets which comprise said content to be delivered to the requesting client;
2. identifying the one of said plurality of switches in which said respective preprocessed packets are stored,
3. transmitting a control message from said host processor to said identified switch, said control message indicating a request to send said respective preprocessed packets from said switch to the requesting client, said control message not containing the requested content, or a portion thereof,
4. transmitting a copy of said respective preprocessed packets from said switch via one of its output ports through said network to said requesting client, while retaining thereafter said respective preprocessed packets in storage at said switch.

7. A data communications system for delivering continuous media content upon specific request by one of said clients, said system comprising a communications network to which a host processor, a plurality of switches and a plurality of clients are connected, said content being stored in form of preprocessed packets in one of said switches, said system further comprising:

1. means for transmitting a request message from the client requesting said continuous media content, or a portion thereof, to the host processor for a copy of the respective preprocessed packets which comprise said continuous media content to be delivered to the requesting client;
2. means for identifying the one of said plurality of switches in which said respective preprocessed packets are stored,
3. means for transmitting a control message from said host processor to said switch identified, said control message indicating a request to send respective preprocessed packets from said switch to the requesting client, said control message not containing the requested content, or a portion thereof,
4. means for transmitting a copy of said respective preprocessed packets from said switch via one of its output ports through said network to said requesting client, while retaining thereafter said respective preprocessed packets in storage at said switch.

8. System for distribution of continuous media content, having a host processor, a plurality of clients, and switches and/or routers having several output ports, said host processor comprising:

1. means for receiving requests from clients for transmission of a portion of said content stored in form of preprocessed packets,
2. means for identifying a particular switch or router in which the respective preprocessed packets comprising requested content are stored,
3. means for generating and transmitting a control message informing said particular switch or router that the transmission of said respective preprocessed packets is requested, said control message not containing the requested content, or a portion thereof, said switches and/or routers comprising 1. means for storing said continuous media content, segmented into preprocessed packets, in a media content memory.
2. means for receiving said control message from said host processor.
3. means for making a copy of said respective preprocessed packets in said media content memory.
4. means for scheduling and transmitting said copy of said specific preprocessed packets through one of the output ports of said switch or router to said particular client, while retaining thereafter said respective preprocessed packets in said media content memory.

* * * * *

UNITED STATES PATENT AND TRADEMARK OFFICE
CERTIFICATE OF CORRECTION

PATENT NO. : 5,758,085

DATED : May 26, 1998

INVENTOR(S) :
Jack Lawrence Kouloheris et al.

It is certified that error appears in the above-identified patent and that said Letters Patent is hereby corrected as shown below:

Title page, item [75], delete "Kouoheris" and replace with --Kouloheris--.

Signed and Sealed this

Thirteenth Day of July, 1999

Attest:

Q. TODD DICKINSON

*Attesting Officer*     *Acting Commissioner of Patents and Trademarks*